US008925811B2

(12) United States Patent
Collins, Jr. et al.

(10) Patent No.: US 8,925,811 B2
(45) Date of Patent: Jan. 6, 2015

(54) CHECKOUT SYSTEM INCLUDING ROTATING BARCODE READER

(71) Applicant: NCR Corporation, Duluth, GA (US)

(72) Inventors: Donald A. Collins, Jr., Buford, GA (US); Janry Amada, Cebu (PH)

(73) Assignee: NCR Corporation, Duluth, GA (US)

( * ) Notice: Subject to any disclaimer, the term of this patent is extended or adjusted under 35 U.S.C. 154(b) by 83 days.

(21) Appl. No.: 13/753,013

(22) Filed: Jan. 29, 2013

(65) Prior Publication Data

US 2014/0209675 A1 Jul. 31, 2014

(51) Int. Cl.
*G06K 15/00* (2006.01)
*G06Q 90/00* (2006.01)

(52) U.S. Cl.
CPC .................................... *G06Q 90/00* (2013.01)
USPC .......................................................... 235/383

(58) Field of Classification Search
CPC .......................... G06Q 20/20; G06K 7/10623
USPC .......................................................... 235/383
See application file for complete search history.

(56) References Cited

U.S. PATENT DOCUMENTS 7,970,650 B2 * 6/2011 Tokorotani ..................... 705/17
2013/0153656 A1 * 6/2013 Skiles ........................... 235/383

* cited by examiner

*Primary Examiner* — Jamara Franklin
(74) *Attorney, Agent, or Firm* — Paul W. Martin

(57) ABSTRACT

A checkout system including a rotating barcode reader. In an example embodiment, the checkout system includes a base, a platform rotatable with respect to the base, a substantially circular top plate mounted to the platform including a window; and a barcode reader on the platform adjacent the window. The substantially circular top plate and the barcode reader are rotatable with the platform.

24 Claims, 6 Drawing Sheets

FIG. 3
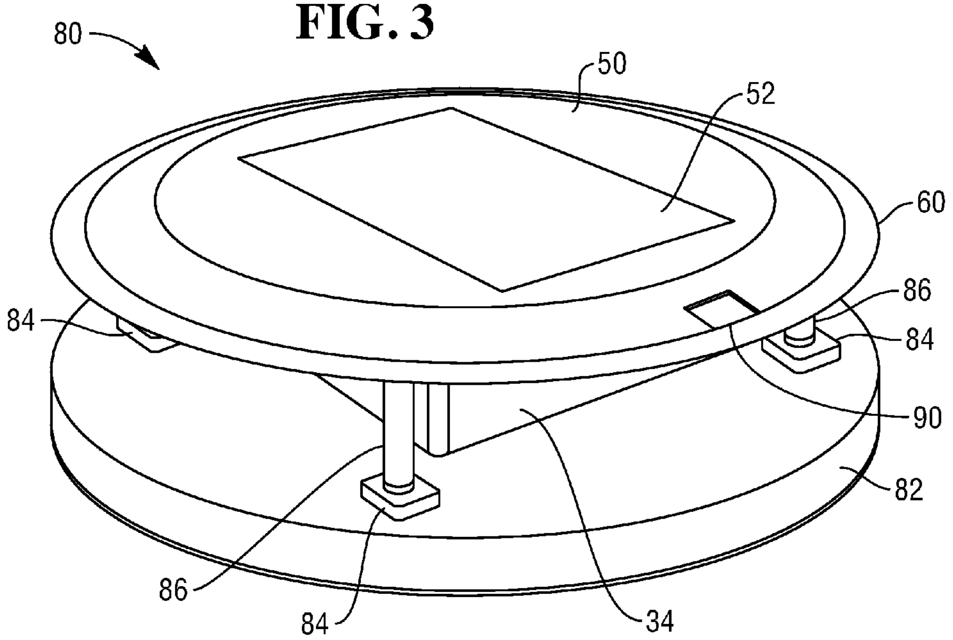
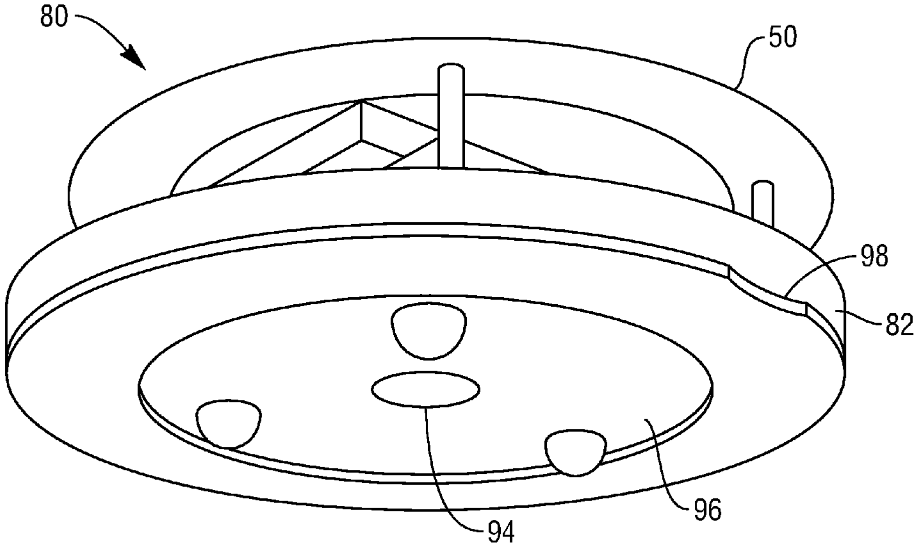
FIG. 4

CHECKOUT SYSTEM INCLUDING ROTATING BARCODE READER

BACKGROUND

The present invention relates to checkout systems, and more specifically to a checkout system including a rotating barcode reader.

Fixed barcode readers are mounted within a checkout counter. The footprint or mounting aperture of fixed barcode readers is rectangular. When equipped with built-in scales, fixed barcode readers include rectangular weigh plates.

One type of fixed barcode reader can read barcodes presented on any of a plurality of sides of an item, thereby minimizing the need for an operator to orient an item with respect to the barcode reader during scanning. This type of barcode reader may include a dual-aperture barcode reader, with a horizontal window and a vertical window. The horizontal window may be substantially flush with the surface of the checkout counter. The vertical window may be located within a tower portion rising from the surface of the checkout counter.

In some checkout environments, it would be desirable to re-configure an assisted-service checkout counter for self-service operation, or vice versa, without asking customers to switch sides or redirect customer traffic past the checkout counters. Since the vertical window of a dual-aperture barcode reader must face the operator in order to easily scan items, checkout systems which contain dual-aperture barcode readers offer retailers very little flexibility for reconfiguring their stores with more or less of either assisted-service and self-service checkout systems.

U.S. Pat. No. 6,286,758 assigned to the assignee of the present invention discloses an example checkout system including a drawer containing a pivot. A barcode reader is mounted to the pivot. Reconfiguration of the checkout system requires that the drawer be pulled out, the barcode reader rotated, and the drawer be pushed in.

It would be desirable to provide a checkout system which is more easily reconfigured for either assisted-service or self-service operation.

SUMMARY

In accordance with the teachings of the present invention, a checkout system including a rotating a barcode reader is provided.

In an example embodiment, the checkout system includes a base, a platform rotatable with respect to the base, a substantially circular top plate mounted to the platform including a window; and a barcode reader on the platform adjacent the window. The substantially circular top plate and the barcode reader are rotatable with the platform.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

FIG. 3 is a view of an example mounting assembly containing a barcode reader.

FIG. 4 is another view of the example mounting assembly of FIG. 3.

DETAILED DESCRIPTION

Figure 1A:
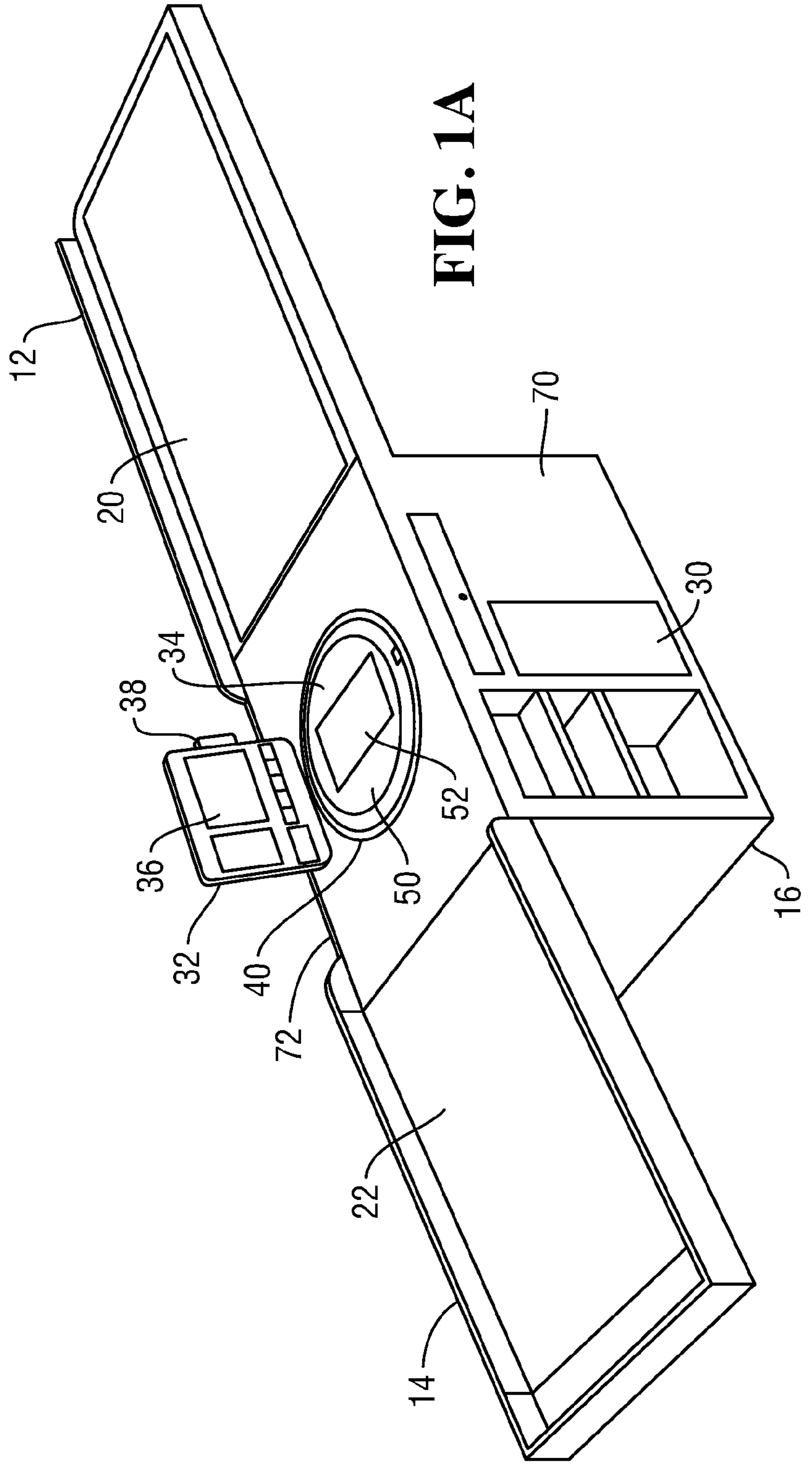
FIG. 1A is a view of a first example checkout system configured as a assisted-service checkout island.

Referring now to FIGS. 1A-1B and 2A-2B, an example checkout system 10 includes a checkout stand with a receiving portion 12, a bagging portion 14, and a scanning portion 16.

Receiving portion 12 includes shelf 20 where purchased items may be placed.

Bagging portion 14 may include a conveyor 22 for conveying purchased items to a location for bagging.

Scanning portion 16 includes terminal 30, terminal interface 32, and barcode reader 34. Scanning portion 16 additionally includes scale 44, which may be part of barcode reader 34 or separate from barcode reader 34.

Terminal 30 may be located within scanning portion 16. Terminal 30 is preferably connected to a store network.

Example terminal interface 32 couples to terminal 30 and includes a touch screen 36 and a card reader 38 for reading loyalty and payment cards.

Example checkout system 10 may include additional peripherals, such as a cash drawer, a receipt printer, a signature capture pad, and a customer display for assisted-service operation and a currency and/or coin acceptor and/or dispenser, a receipt printer, and a signature capture pad for self-service operation.

Figure 1B:
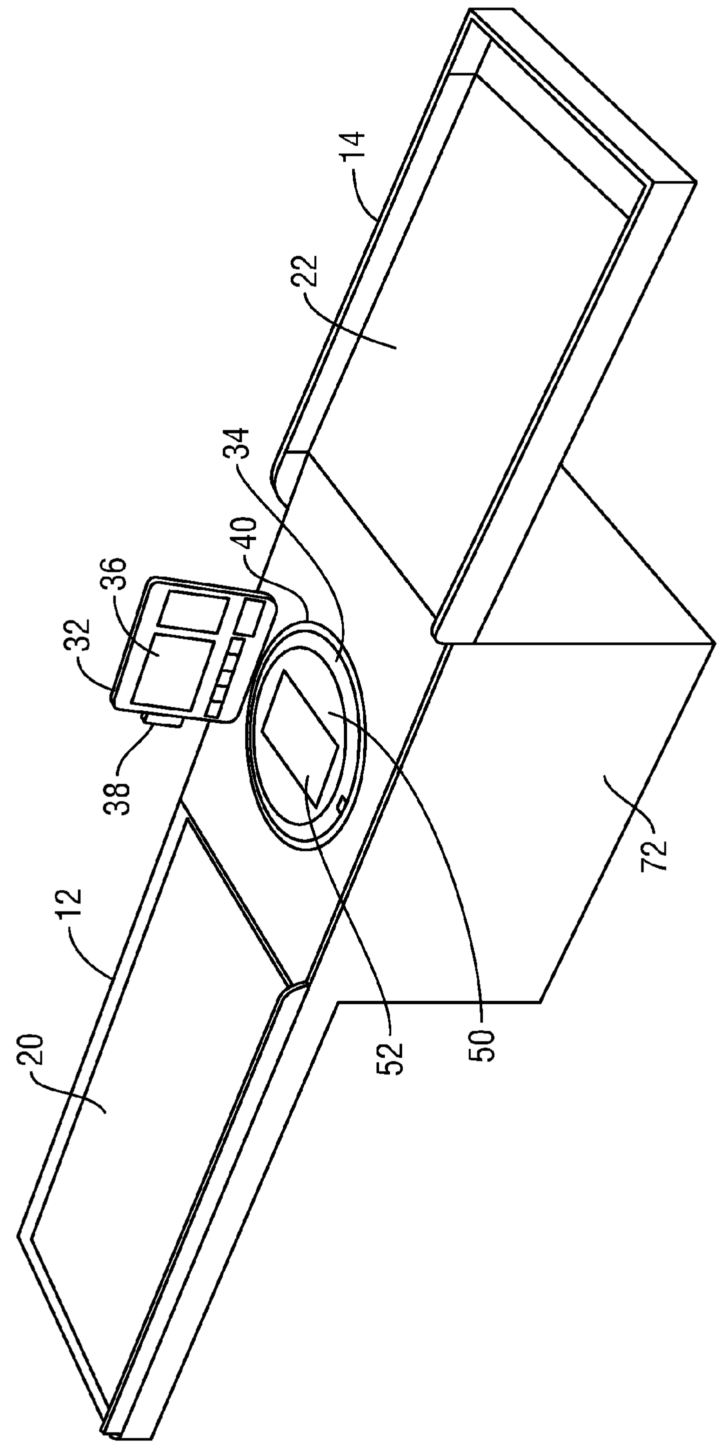
FIG. 1B is a view of the first example checkout system configured as a self-service checkout island.

With reference to the embodiment of FIGS. 1A-1B, terminal interface 32 may be removably mounted to the top surface of scanning portion 16.

In another example, terminal interface 32 may be mounted to a ring 40 separate from weigh plate 50. Ring 40 has substantially circular inner and outer edges and may rotate with weigh plate 50 (e.g., mounted to platform 82—FIG. 3) or be attached to weigh plate 50. Alternatively, ring 40 may be free to rotate separately. In such an example, terminal interface 32 is rotated by rotating ring 40. Any other peripherals, such as card reader 38, mounted to terminal interface 32 and/or ring 40 also rotate.

Scale 44 may include one or more load cells, such as planar load cells.

Figure 2A:
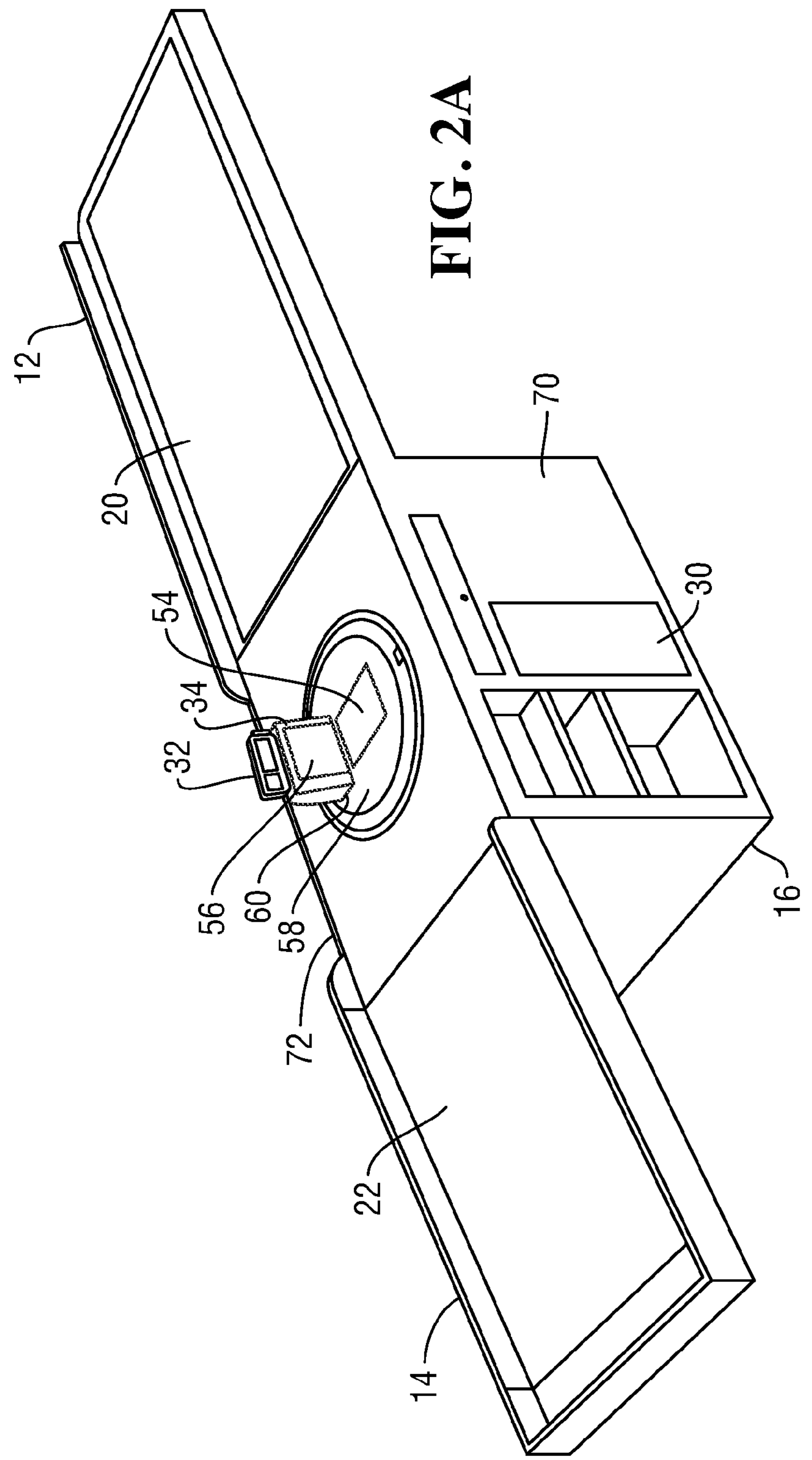
FIG. 2A is a view of a first example checkout system configured as a assisted-service checkout island.
Figure 2B:
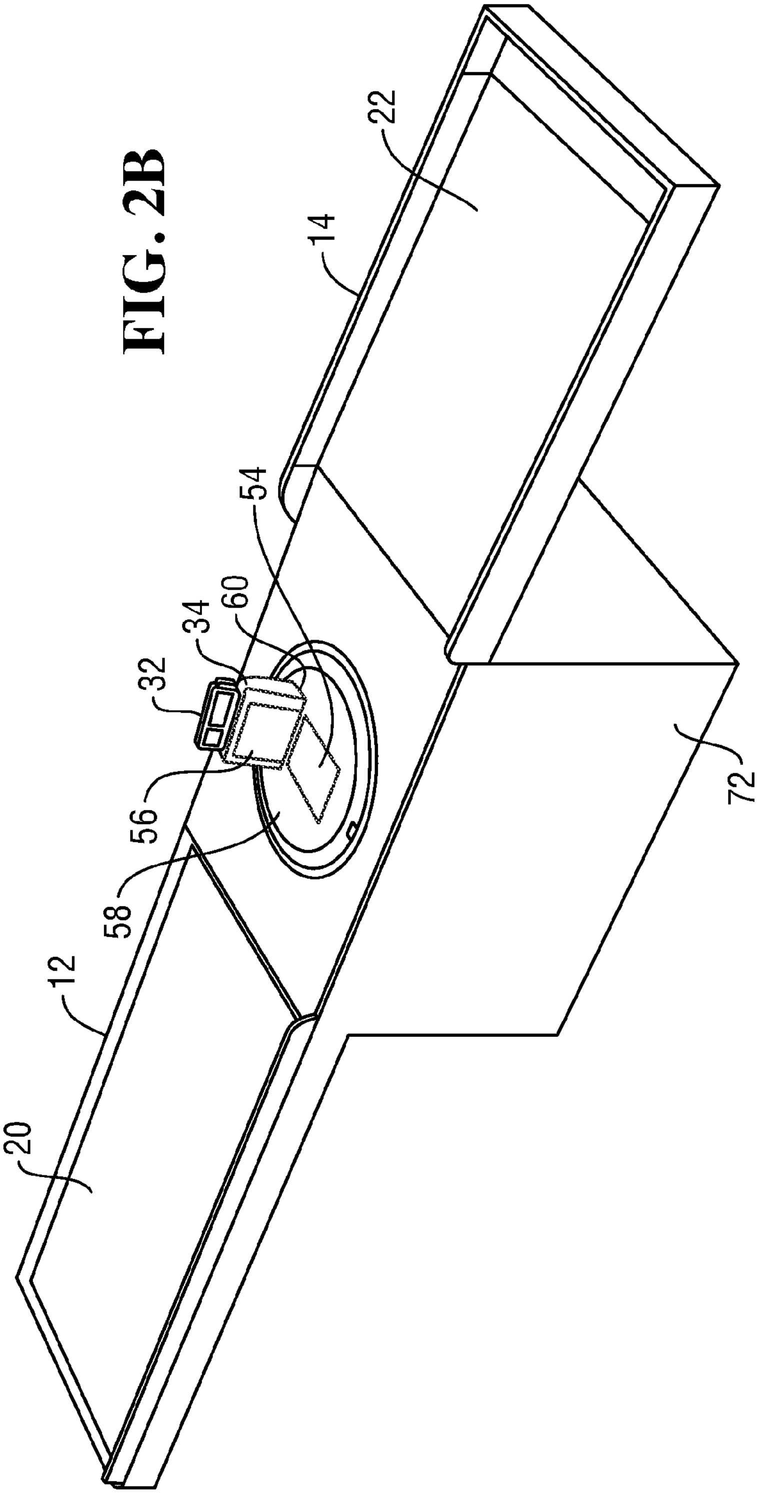
FIG. 2B is a view of the first example checkout system configured as a self-service checkout island.

With reference to the embodiment of FIGS. 2A-2B, terminal interface 32 may be mounted to barcode reader 34.

In other examples, terminal interface 32 may be mounted elsewhere and reconfigured for assisted-service or self-service operation in other ways.

Example barcode reader 34 may be a laser scanner, imaging scanner, or any combination thereof.

With reference to the embodiment of FIGS. 1A-1B, weigh plate 50 is substantially circular in shape and contains window 52. Example window 52 is rectangular in shape, but may be any other shape, such as circular. Window 52 may be made of a scratch-resistant glass. Weigh plate 50 may be made of stainless steel and may be substantially flush with the top surface of scanning portion 16. Weigh plate 50 may additionally include an edge lip to constrain liquids and/or debris.

With reference to the embodiment of FIGS. 2A-2B, weigh plate 58 is substantially circular in shape and contains window 54 and aperture 60.

The example barcode reader 34 may include a dual-aperture bar code barcode reader with a substantially horizontal window 54 and a substantially vertical window 56. Substantially horizontal window 54 may be part of weigh plate 58 and be rectangular in shape.

Substantially vertical window 56 is part of a raised tower portion that extends through aperture 60 in weigh plate 58 above the top surface of scanning portion 16. Substantially vertical window 56 faces an operator during scanning.

Weigh plate 58 may be made of stainless steel and may be substantially flush with the top surface of scanning portion 16. Weigh plate 58 may additionally include an edge lip to constrain liquids and/or debris.

Example checkout system 10 includes a store operator side 70 and a customer side 72. During assisted-service operation, terminal interface 32 faces store operator side 80. A store operator scans items selected for purchase by a customer and completes payment for the items, for example, using card reader 38. During self-service operation, terminal interface 32 faces customer side 72. A customer scans items selected for purchase and completes payment for the items, for example, using card reader 38.

To facilitate a change in operation of checkout system 10 between assisted-service and self-service modes, barcode reader 34 rotates to positions for the corresponding mode of operation. Peripherals mounted to barcode reader 34 and/or fill plate 60 rotate with barcode reader 34 and fill plate 60.

Depending on mounting configuration, terminal interface 32 may rotate with barcode reader 34 or be positioned separately, for example, via ring 40. Peripherals mounted to terminal interface 32, such as card reader 38, reposition with terminal interface 32.

With reference to FIG. 3, an example mounting assembly 80 containing barcode reader 34 and scale 44 includes platform 82. Platform 82 rotates between an assisted-service position and a self-service position during configuration changes.

Barcode reader 34 is mounted to platform 82 and rotates with platform 82. The example barcode reader 34 is a single-aperture barcode reader, though a multi-aperture barcode reader may also be mounted to platform 82 as in FIGS. 2A-2B.

Scale 44 includes planar load cells 84, which are mounted to platform 82. Posts 86 are mounted to planar load cells 84 and support weigh plate 50 above barcode reader 34. Planar load cells 84, posts 86, and weigh plate 50 rotate with platform 82.

In one example embodiment, weigh plate 50 includes an indent 90 near its outer edge. A torque applied to weigh plate 50 at indent 90 causes platform 82 to rotate about its centerline.

With reference to FIG. 4, platform 82 is supported by a stationary base 96. In one example embodiment, platform 82 and base 96 are separated by ball bearings, which allow platform 82 to freely move. Aperture 94 along with a corresponding aperture in platform 82 provide access for cable runs to barcode reader 34, scale 44, and terminal interface 32. The apertures are centrally located to minimize cable movement and twisting during rotation of platform 82.

Platform 82 may include a detect 98 which engages corresponding latches in the mounting recess 100 (FIG. 5) at assisted-service and self-service positions to prevent rotation of platform 82 at times other than reconfiguration.

Figure 5:
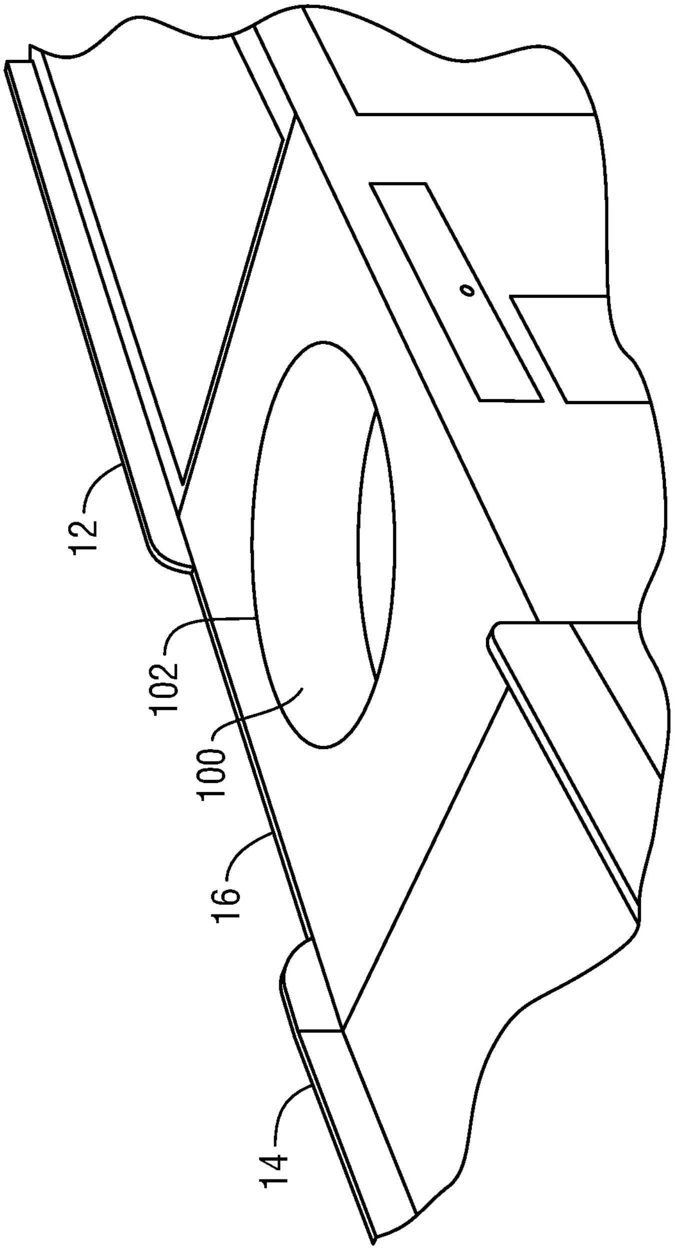
FIG. 5 is a view of a checkout counter where the example mounting assembly of FIGS. 3-4 is inserted.

With reference to FIG. 5, scanning portion 16 includes circular aperture 102 defining mounting recess 100 into which assembly 80 is inserted during installation. A predetermined distance separates weigh plate 50 from aperture 102.

In operation, an operator applies a finger or other tool to indent 90 to rotate platform 82 about its centerline from a self-service operating position to an assisted-service operating position, and back again. The angle between the two positions may be about 180 degrees. At the self-service operating position, a self-service checkout transaction using the barcode reader is performed by a customer. At the assisted-service operation position, an assisted-service checkout transaction is performed by an operator. Advantageously, the operator may rotate platform 82 without removing barcode reader from the checkout counter.

Although particular reference has been made to certain embodiments, variations and modifications are also envisioned within the spirit and scope of the following claims.

What is claimed is:

1. A checkout system comprising:
a mounting assembly suited for location inside a checkout counter including
a base;
a platform rotatable with respect to the base;
a substantially circular top plate mounted to the platform including a window, wherein the to plate is substantially flush with a top surface of the checkout counter; and
a barcode reader on the platform below the window;
wherein the substantially circular top plate and the barcode reader are rotatable with the platform.

2. The system of claim 1, wherein the top plate comprises a weigh plate and the checkout system further comprises a scale assembly supporting the weigh plate which is mounted to the platform.

3. The system of claim 1, wherein the barcode reader further comprises a housing portion extending above the top plate with a substantially vertical window.

4. The system of claim 1, wherein the base includes first and second detent positions, wherein the platform is rotatable to the first detent position for a first mode of operation and are rotatable to the second detent position for a second mode of operation.

5. The system of claim 4, wherein the first mode of operation comprises a self-service mode of operation.

6. The system of claim 4, wherein the second mode of operation comprises an assisted-service mode of operation.

7. The system of claim 1, wherein the barcode reader is mounted to an underside of the top plate.

8. The system of claim 1, wherein the barcode reader is mounted to the platform.

9. The system of claim 2, wherein the scale assembly comprises a plurality of planar load cells mounted to the platform.

10. The system of claim 2, further comprises a ring around the weigh plate and mounted to the platform which is rotatable with the platform, and a terminal interface mounted to the ring.

11. A checkout system comprising:
a mounting assembly suited for location within a checkout counter including
a stationary base;
a platform rotatable with respect to the stationary base;
a barcode reader mounted to the platform;
a scale assembly mounted to the platform; and
a substantially circular top plate on the scale assembly including a window, wherein the barcode reader is located below the window.

12. The system of claim 11, wherein the stationary base includes first and second detent positions, wherein the platform is rotatable to the first detent position for a self-service mode of operation and is rotatable to the second detent position for an assisted-service mode of operation.

13. The system of claim 11, wherein the barcode reader further comprises a housing portion extending through an aperture in the weigh plate with a substantially vertical window.

14. The system of claim 11, wherein the scale assembly comprises a plurality of planar load cells mounted to the platform.

15. The system of claim 11, wherein the stationary base includes a first cable aperture and wherein the platform includes a corresponding second cable aperture.

16. The system of claim 11, wherein the substantially circular top plate is substantially flush with a top surface of the checkout counter when the mounting assembly is inserted within the checkout counter.

17. A method of operating a barcode reader comprising:

rotating a platform mounted inside a checkout counter containing the barcode reader about a centerline of the platform to a transaction position by rotating a substantially circular top plate above the barcode reader and including a window, wherein the substantially circular to plate is substantially flush with a to surface of the checkout counter and coupled to the platform; and operating the barcode reader so as to perform a checkout transaction in which items are scanned with the barcode reader.

18. The method of claim 17, further comprising:

rotating the platform about the centerline to another transaction position; and operating the barcode reader so as to perform a different type of checkout transaction in which other items are scanned with the barcode reader.

19. The method of claim 18, wherein the one checkout transaction comprises a self-service checkout transaction and the other checkout transaction comprises an assisted-service checkout transaction.

20. The method of claim 18, wherein the angle between the one and the other transaction positions is about 180 degrees.

21. A checkout system comprising:

a base;

a platform rotatable with respect to the base;

a substantially circular top plate mounted to the platform including a window;

a scale assembly supporting the weigh plate which is mounted to the platform; and a barcode reader on the platform adjacent the window;

wherein the substantially circular top plate and the barcode reader are rotatable with the platform.

22. The system of claim 21, wherein the scale assembly comprises a plurality of planar load cells mounted to the platform.

23. The system of claim 21, further comprises a ring around the weigh plate and mounted to the platform which is rotatable with the platform, and a terminal interface mounted to the ring.

24. A mounting assembly suited for location within a checkout counter comprising:

a base;

a platform rotatable with respect to the base; and a substantially circular top plate mounted to the platform including a window, wherein the top plate is substantially flush with a top surface of the checkout counter;

wherein the mounting assembly defines a space between the platform and the substantially circular top plate suited for mounting a barcode reader; and wherein the substantially circular top plate and the barcode reader are rotatable with the platform.

* * * * *